March 4, 1952   H. W. CUSTER   2,588,212
FLUID PRESSURE ACTUATED TUBE COMPRESSOR
Filed Oct. 28, 1948   2 SHEETS—SHEET 1

Inventor
Harry Willis Custer
By Clarence A. O'Brien
and Harvey B. Jackson
Attorneys March 4, 1952 H. W. CUSTER 2,588,212
FLUID PRESSURE ACTUATED TUBE COMPRESSOR
Filed Oct. 28, 1948 2 SHEETS—SHEET 2
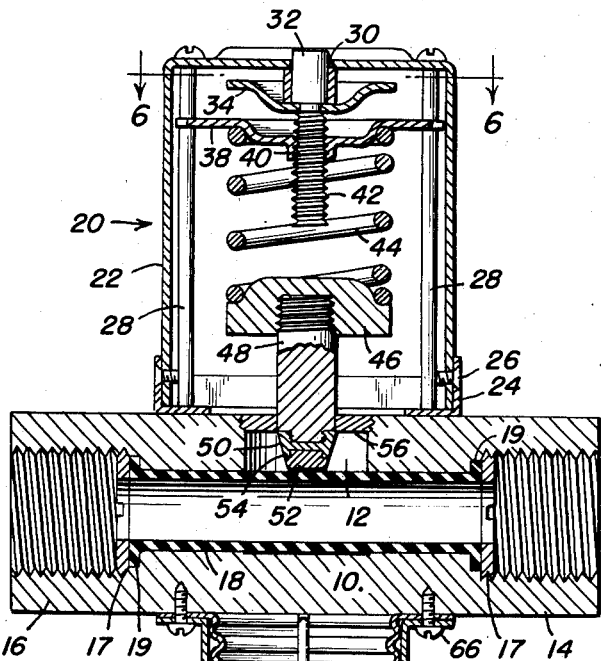
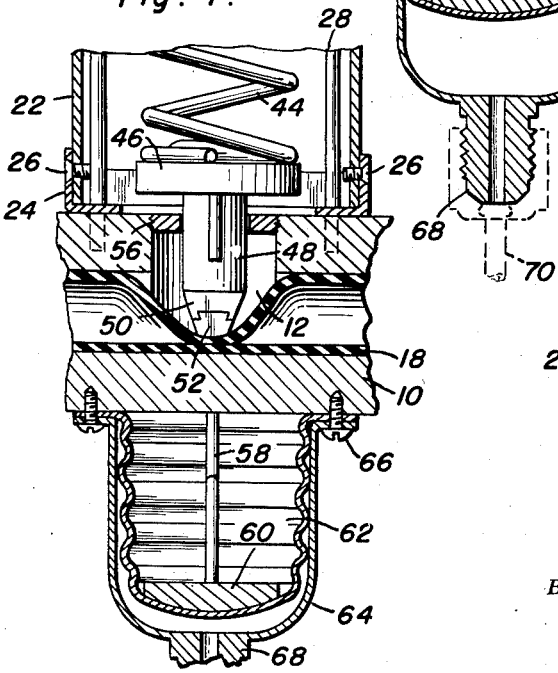
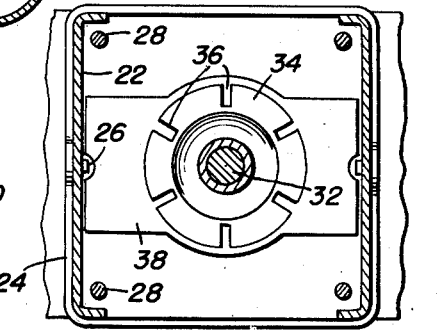
Inventor
Harry Willis Custer
By Clarence A. O'Brien
and Harvey B. Jacobson
Attorneys Patented Mar. 4, 1952

2,588,212

UNITED STATES PATENT OFFICE 2,588,212

FLUID PRESSURE ACTUATED TUBE COMPRESSOR

Harry Willis Custer, Center Line, Mich., assignor to Ansul Chemical Company, Marinette, Wis., a corporation of Wisconsin Application October 28, 1948, Serial No. 57,027

1 Claim. (Cl. 137—153)

This invention relates generally to valves and more particularly to a valve in which a spring biased plunger assembly is automatically operated by pressure responsive means to collapse and release a resilient tube inserted between the inlet and the outlet in a valve body.

A primary object of this invention is to provide a simple valve construction which is accurately responsive to changes in pressure in a compartment which is not necessarily connected directly with the inlet or outlet.

Another object of this invention is to provide a valve construction which provides for a positive and complete closure of the valve as well as a controlled partial closure of the valve, there being practically no opportunity for the development of leaks during the life of the valve.

Still another object of this invention is to provide a valve in which the only perishable portions are easily replaceable at no great cost.

Yet another object is to provide a valve which will be accurately responsive to pressure changes and adjustable through wide limits as to its action in response to pressure changes.

A specific object is to provide a valve construction which is ideally suited for use as a water valve in refrigeration systems, although the valve is by no means limited in its application to this particular use.

And the last object to be mentioned specifically is to provide a valve which is relatively inexpensive and practicable to manufacture, which is simple, convenient and dependable in use and very easily adjusted, and which will give generally efficient and durable service.

With these objects definitely in view, this invention resides in certain novel features of construction, combination and arrangement of elements and portions as will be hereinafter described in detail in the specification, particularly pointed out in the appended claim, and illustrated in the accompanying drawings which form a material part of this application, and in which:

Figure 2 is a vertical sectional view of the assembled valve;

Figure 4 is a vertical sectional view, fragmentary in character and showing the valve in fully closed position;

Figure 6 is a horizontal sectional view, taken on the line 6—6 in Figure 2 and looking in the direction of the arrows.

Similar characters of reference designate similar or identical elements and portions throughout the specification and throughout the several views of the drawings.

Figure 7:
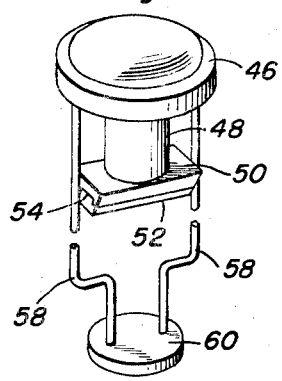
Figure 7 is a three dimensional view on a reduced scale showing the plunger assembly as removed from the valve.
Figure 1:
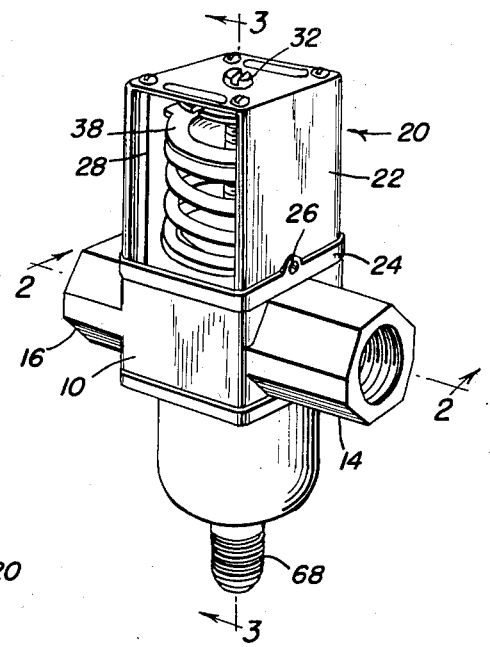
Figure 1 is a three dimensional view of the assembled valve.
Figure 3:
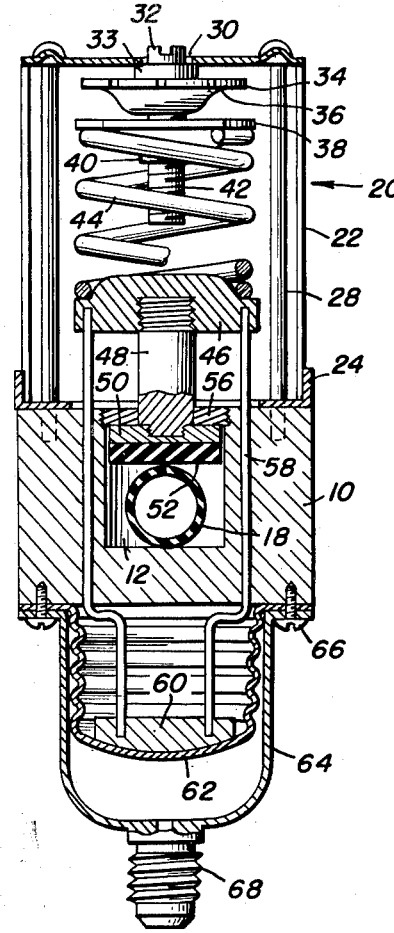
Figure 3 is a transverse vertical sectional view, this view as well as the preceding view showing the valve in full open position.
Figure 5:
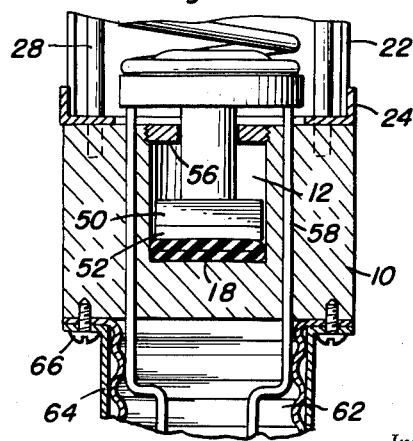
Figure 5 is a fragmentary vertical sectional view taken transversely of the valve and showing the valve in fully closed position.

Referring now to the drawings in detail, this valve includes a valve body 10 having a central cavity 12 and an inlet 14 and outlet 16 communicating with the cavity 12 through a bore which may be of reduced diameter as related to the threaded portions of the inlet and outlet. If reference be had to Figure 2, it will be clear how a pair of externally threaded clamping rings 17 are screwed into the inlet and outlet to seal a tube 18 of flexible resilient material in place within the above-mentioned bore of the body member 10 of the valve, these clamping rings 17 being turned in tightly against radially extending terminal lip flange portions 19 of the tube 18, and it may also be noted that the clamping rings 17 have diametrically disposed slots to receive a tool used to screw the clamping rings into place.

An organization of elements hereinafter referred to as the frame 20 includes an inverted U-shaped member constructed preferably of sheet material and indicated at 22, the depending arm portions of this member being removably secured within a skirt flange 24 on the valve body 10, screws 26 being inserted through portions of the skirt flange 24 into the member 22. A plurality of elongated studs 28 are inserted through the top portion of the member 22 and screwed into threaded bores provided therefor in the valve body 10. The top portion of the member 22 is apertured as at 30 to receive an outer portion of the threaded member 32 which is slotted to receive a tool such as a screwdriver, this threaded member also including a collar portion which bears against the inner surface of the top plate portion of the member 22, and a disk portion 34 which is peripherally and radially slotted as indicated at 36. A spring abutment plate 38, preferably of rectangular form as clearly illustrated in Figure 6 is vertically slidably mounted within the inverted U-shaped member 22, this abutment plate 38 being prevented from rotating by its frictional engagement with the member 22, while having an internally threaded collar 40 which coacts with a threaded extension 42 of the threaded member 32. The spring abutment plate 38 is thus made adjustable vertically by turning the threaded member 32 either by inserting a tool in one of the slots 36 or in the slot in the end of the threaded member 32. A helical spring 44 is compressed between the spring abutment plate 38 and the upper end plate 46 of the assembly hereinafter referred to generally as the yoke, this yoke being represented separately from the other elements of this invention in Figure 7.

The yoke carries a plunger comprised of a terminally threaded shank 48 secured at its upper end to the top end plate 46 of the yoke and at its lower end to a plunger head 50 which is elongated transversely of the valve and slides within the cavity 12. The plunger head 50 has a resilient cap 52, preferably dovetailed into the plunger head as indicated at 54 and of a length substantially equal to the plunger head. This resilient cap engages the tube 18 when the valve is closed or partially closed. A threaded bushing 56 is screwed into the upper end of the cavity 12 and comprises a bearing for the plunger shank 48.

The yoke also includes a pair of rods 58 rigidly secured at their upper ends in the upper end plate 46 and slidably mounted within bores provided therefor in the valve body 10, these rods extending completely through the valve body and offset near their lower ends which are rigidly secured to the lower end plate 60 of the yoke. Actuation of the yoke is accomplished by a bellows 62 within the end of which the lower end plate 60 of the yoke is pressed by the spring 44, and the bellows 62 is protected by a cup-shaped cover 64 secured by screws 66 onto the valve body 10. The cover 64 is, of course, apertured at its outer end and is provided with an attachment nipple 68 adapting the valve for securement to a pressurized line in the equipment wherewith this valve is to be used, as indicated in dash line at 70 in Figure 2.

The operation of this invention will be clearly understood from a consideration of the drawings, the foregoing description of the mechanical details of the invention and the above recited objects. In recapitulation, it may be noted that the plunger will be actuated in response to pressure changes within the cover 64, this arrangement illustrated in the drawings indicating an increase of pressure in the chamber of the cover 64 will cause the bellows 62 to collapse and release the plunger from engagement with the tube 18, this action being against the action of the spring 44 which urges the plunger into a position closing the tube 18. It follows that adjustment of the spring 44 will allow the tube 18 to be opened a predetermined amount according to pressure changes. Due to the comparative simplicity of this invention, further description would appear unnecessary.

Obviously, minor variations from the embodiment represented in the drawings and described above may be resorted to without departure from the spirit of this invention and the scope thereof should be determined only as limited by a proper interpretation of the terms used in the subjoined claim.

Having described the invention, what is claimed as new is:

A valve comprising a valve body having a cavity, an inlet and an outlet communicating directly with said cavity, a flexible and resilient tube extending through said cavity and connecting said inlet and outlet, a plunger mounted on said valve body for movement within said cavity to collapse and to release said tube, a yoke carrying said plunger, spring means biasing said yoke in one direction to collapse said tube, and a pressure responsive bellows operatively connected with said yoke to bias the plunger in the opposite direction, said yoke including a pair of rods slidably mounted in parallel transverse bores in said valve body, an end plate secured to each pair of adjacent ends of said rods, one end plate being disposed within said bellows, said bellows being secured on one side of said valve body, a frame on the opposite side of said valve body, said frame having an abutment plate adjustably mounted in said frame, and said spring means comprising a helical spring compressed between said abutment plate and the other of said end plates.

HARRY WILLIS CUSTER.

REFERENCES CITED

The following references are of record in the file of this patent:

UNITED STATES PATENTS

| Number | Name | Date |
| --- | --- | --- |
| 740,170 | Osborne | Sept. 29, 1903 |
| 1,120,002 | Walquist | Dec. 8, 1914 |
| 2,006,196 | Crowley | June 25, 1935 |
| 2,244,686 | Garrison | June 10, 1941 |
| 2,305,840 | Brown | Dec. 22, 1942 |
| 2,387,660 | Hall | Oct. 23, 1945 |

FOREIGN PATENTS

| Number | Country | Date |
| --- | --- | --- |
| 101,831 | France | of 1874 |